Sept. 29, 1970     C. C. HOFFMANN ET AL     3,531,169
FOOD SERVICE CART
Filed Aug. 1, 1968     4 Sheets-Sheet 1
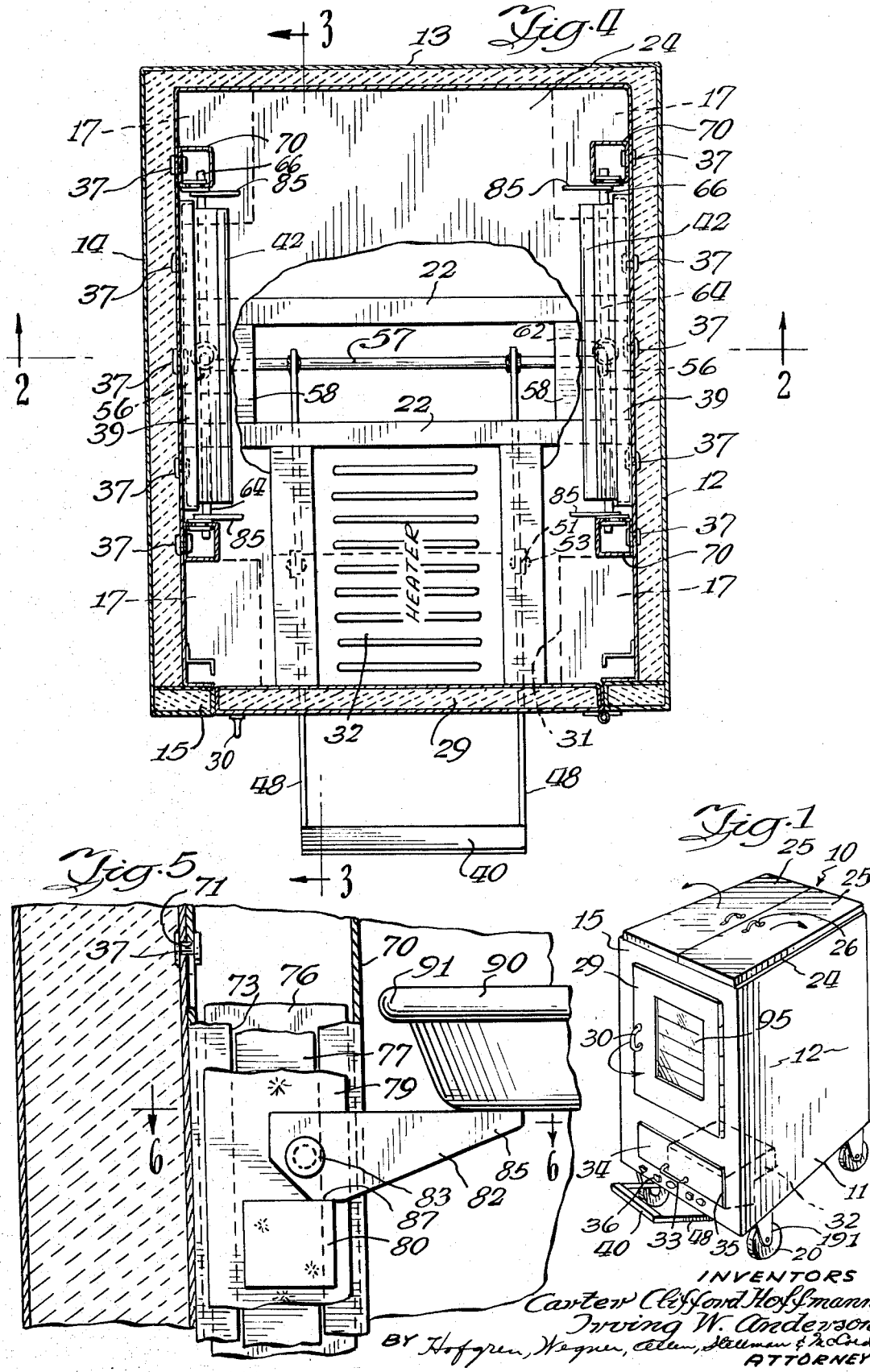
INVENTORS
Carter Clifford Hoffmann
Irving W. Anderson
BY Hofgren, Wegner, Allen, Stellman & McCord
ATTORNEYS

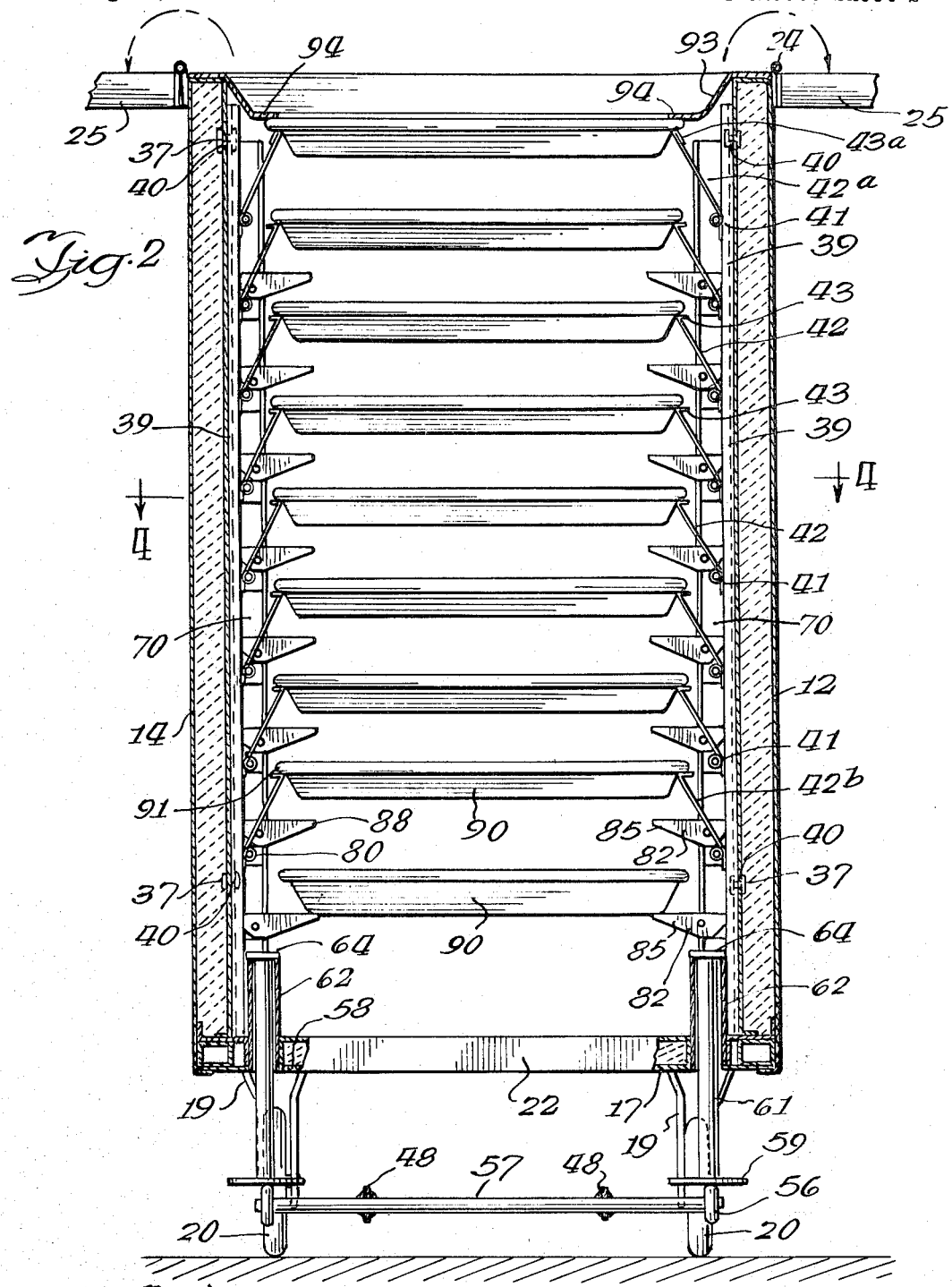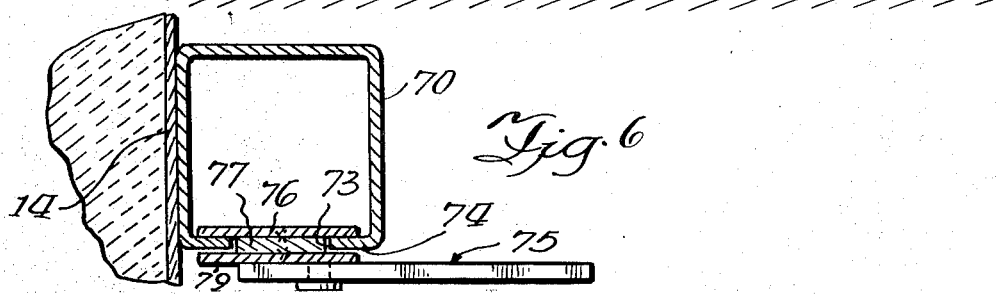

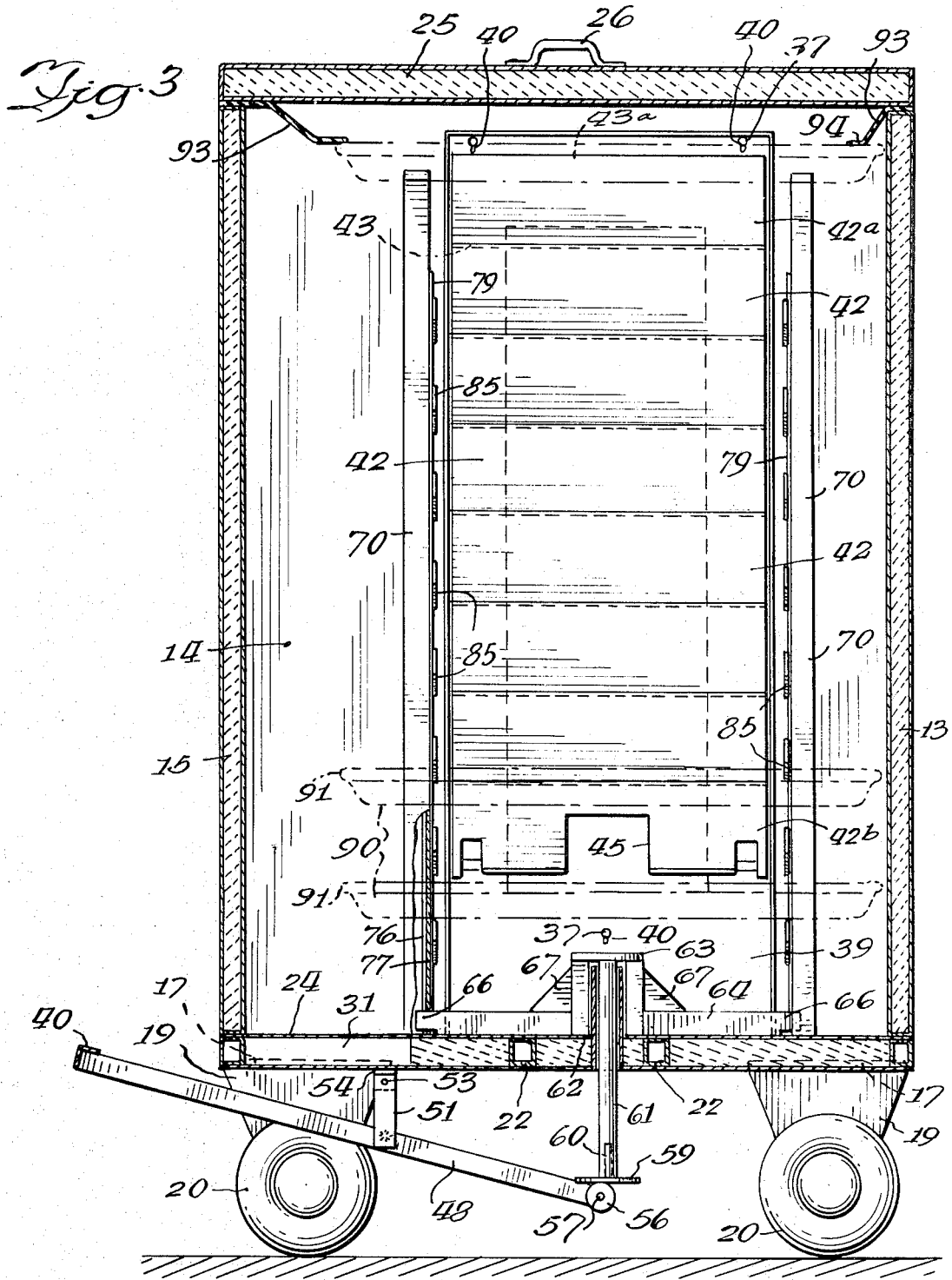

Sept. 29, 1970    C. C. HOFFMANN ET AL    3,531,169
FOOD SERVICE CART
Filed Aug. 1, 1968    4 Sheets-Sheet 4
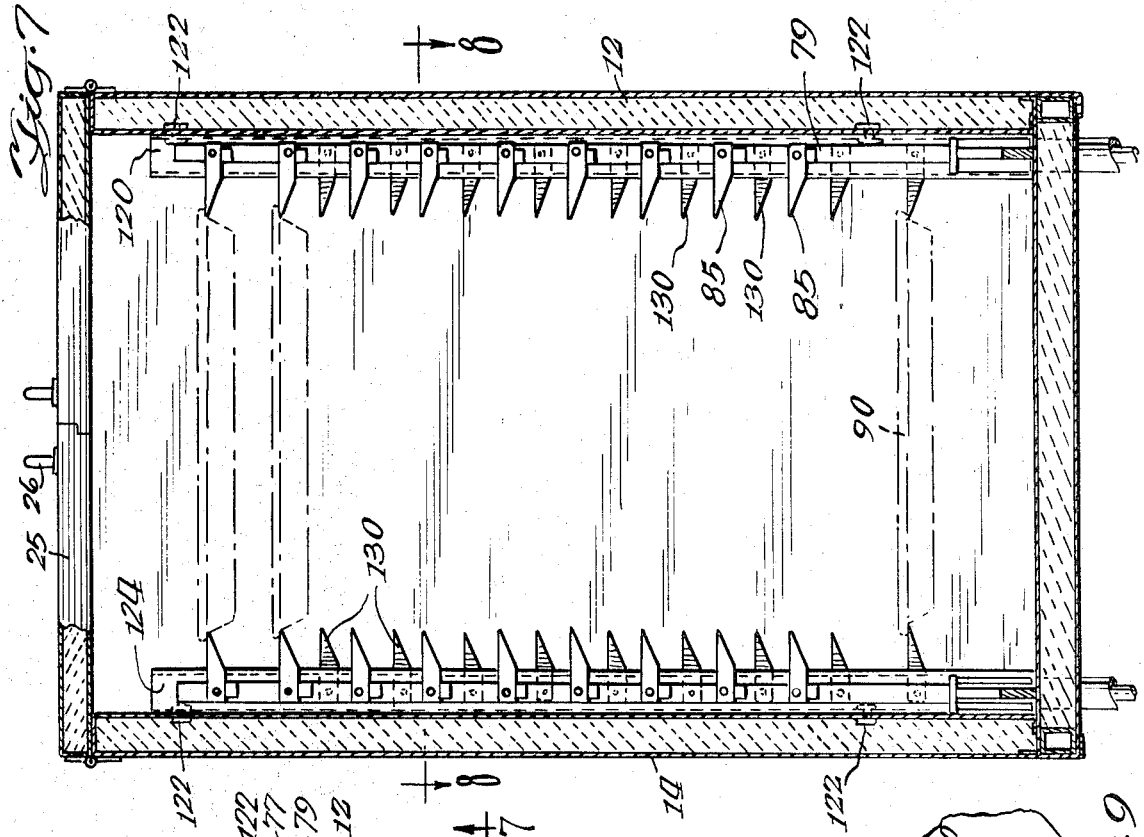

United States Patent Office 3,531,169
Patented Sept. 29, 1970

3,531,169
FOOD SERVICE CART
Carter Clifford Hoffmann, Lake Forest, and Irving W. Anderson, Waukegan, Ill., assignors to Carter-Hoffmann Corporation, Mundelein, Ill., a corporation of Illinois
Filed Aug. 1, 1968, Ser. No. 749,494
Int. Cl. A47b 67/02
U.S. Cl. 312—236                           13 Claims

ABSTRACT OF THE DISCLOSURE

A temperature insulated food service cart is provided with an externally actuated means for raising one or more trays adapted to carry food located inside the cart such that the top tray, when at the top of the cart, is accessible through a door opening thereinto. Food can be served from said top tray or the top tray can be removed through the access opening. Each operation of the actuating means will raise all the trays in the cart one level. The cart is designed so that all parts, including the heating or cooling element, can be removed from inside the cart for cleaning purposes.

FIELD OF THE INVENTION

This invention relates to temperature controlled food service carts and more particularly to a food service cart having externally operated means for raising trays of food from a storage area to a serving area.

DESCRIPTION OF THE PRIOR ART

Food service carts have been known and used for some time. These carts generally are heat insulated and have provision for sliding trays of food through a door onto shelves in the cart interior where the food would be kept warm until ready to be served. The cart is wheeled to the serving location where the door is opened and the trays of food are removed and served. There are also carts which can have the tops and sides opened for more convenient removal and serving of food.

There are many different food serving problems that require different solutions. One such problem is in the carry-out food serving field where the demand can be high for short periods of time, which demand would far exceed the practical availability of equipment and personnel to meet the need. For instance, in the fried chicken carry-out business, only so many pieces of chicken can be fried in a given period of time which would nowhere near meet the demand. For some time it has been the practice to precook the chicken or other food and keep it hot by placin git in an oven or in a conventional food storage cart. Neither of these last two mentioned systems are desirable in that when the door of the oven or cart is opened to add or to remove a tray of food, all of the food inside is cooled and dehydrated. The opening and closing of the oven or cart door continually permits the heated food to become dried and cooled or the chilled food to become warmed.

SUMMARY OF THE INVENTION

To overcome the hereinabove described problems, a newly designed heat insulated food serving cart has been invented which has means for inserting trays of food into the interior of the cart from one door controlled access opening and by a remotely operated mechanism the trays are moved to a position adjacent another door controlled opening. The second opening is covered and has a means for keeping the remaining food in the cart sealed from the second opening so that uncovering the second opening only permits access to the nearest tray and/or the food on said tray. Food can be served directly from the nearest or top-most tray when the door is opened or the tray can be removed and the door closed. The next tray can be raised up into position for ready access when the door is again opened. The same principle of serving food directly from the access opening in a cart can be used in restaurants wherein food can be served directly onto individual plates from the topmost tray exposed when the door is opened.

A heating and humidifying means is provided on the inside of the cart for keeping the food hot and moist. In some cases a cooling means is provided in the cart for maintaining the inside of the cart cool and with the correct humidity. All mechanisms including the temperature regulating means can be removed from within the inside of the cart to permit complete and thorough cleaning between uses.

Other objects and advantages of this invention will be apparent from the following description of the drawings in which:

FIG. 1 is a perspective view of a food serving cart incorporating the invention;

FIG. 2 is a cross sectional view taken on the line 2—2 of FIG. 4;

FIG. 3 is a cross sectional view taken on the line 3—3 of FIG. 4;

FIG. 4 is a cross sectional view taken on the line 4—4 of FIG. 2;

FIG. 5 is an enlarged broken away and sectional view of one of the lift ratchet elements;

FIG. 6 is a cross sectional view taken on the line 6—6 of FIG. 5;

FIG. 7 is a modified form of the invention embodying different ratchet and retaining members on the inside of the cart as taken on the line 7—7 of FIG. 8;

FIG. 8 is a cross sectional view of the modified form of invention shown in FIG. 7 taken on the line 7—7 therein; and FIG. 9 is a broken away and enlarged view of one of the lift ratchet means of FIG. 7.

Referring to the drawings wherein like reference numerals refer to like parts throughout the several views, a food service cart 10 is provided with a housing 11 having stainless steel or the like side walls 12, 13, 14 and 15, each one of which is composed of spaced apart sheets of material which have insulation therebetween. A plate 17 is welded in each lower corner portion of the housing 11 upon which is secured a swivel or the like bracket 19 and caster 20 so that the cart can be wheeled about. A brake can be provided on one or more of the wheels or casters 20 for holding the cart in a desired location.

A pair of cross-bars 22 extend between the side walls 12 and 14 at the lowermost portion thereof so as to lend rigidity to the housing and to provide a support for a removable bottom wall 24 which is placed inside the housing before any other removable parts are installed, as will be explained hereinafter.

A pair of cover doors 25 are hinged to the sides 12, 14 by piano hinges 24' or the like and have handles 26 which can be grasped for opening and closing the doors. The doors 25 are shown mounted in such a way that when opened, they will form serving platforms on either side of the open top of the housing, see FIG. 2.

A front door 29 is hinged to the front wall 15 and has a handle 30 for opening the door to gain access into the interior of the cart. A removable heating or cooling element 32 is adapted to be inserted into an appropriate recess 31 in the bottom wall 24 of the housing 11 through a door 34 and opening 35 in the front of the housing. The door 34 has a handle 33 for opening and closing thereof. A set of controls 36 is accessible near the bottom of the wall 15 which can be used to vary the temperature and humidity setting for the inside of the housing. A typical heating and humidifying element for a device of this type is shown in U.S. Pat. 2,790,888 in the name of Carter H. Hoffman, one of the coinventors of the present invention. It is to be understood that the element 32 could be a cooling element for use when the cart is intended to store and be used in serving chilled or cool foods. The element 32 can be readily removed and replaced through the door 34.

Within the housing are several headed lugs 37 which project inwardly from the inside of the side walls 12 and 14. During cleaning of the cart these lugs 37 are the only projections into the inside of the housing.

On each inside wall 12 and 14 is hung a base plate 39 by means of bayonet slots 40, two at the top and one at the bottom, the edges of which slots engage over the heads of the lugs 37. A plurality of hinged support bars 42 are pivotally secured to each plate in vertically spaced relationship. Each plate or bar 42 is spring urged by springs 41 to an angular position as shown in FIG. 2 and have horizontal ledges 43 projecting toward the plate 39. The top bar 42a on each base plate 39 has its ledge 43a folded back flat against the bar for a purpose to be explained hereinafter. The bars 42 are mounted in such a way that they will not project more than about a 45° angle to the plate 39, but they are resiliently mounted in such a way that an upward force on the underside of each bar will urge it toward the plate 39. The bottom bar 42b has cut out portions 45 in its underside so as to allow clearance for an actuating member to be hereinafter described. As will be readily apparent, the plates 39 with the attached bars 42 can be easily removed for cleaning. The bars 42, 42a and 42b are shown as solid plates. It is contemplated that the bars can be made out of wire or other materials as long as they are strong enough to support the items and as long as they are mounted in such a way as to be movable out of the way during operation of the tray raising mechanism. The plates 42 and 42b can have holes cut therethrough to permit passage of heated or cooled air upward therethrough to more evenly circulate the heating or cooling air.

Between the wheels 20 of the cart, a treadle mechanism 47 projects forwardly, which treadle includes a pair of arms or angle irons 48 connected to a foot plate 40 on the extended end portions thereof. The arms 48 have pivot extension 51 secured as by welding to the midportion thereof, which extensions have pivot pins 53 connecting said extensions 51 to mounting lugs 54 downwardly depending from the housing. A pair of rollers 56 are rotatably mounted on a rod 57 carried by the inner end portions of the arms 48. Each roller 56 engages with a horizontal bottom plate 59 carried by a vertically extending rod 60 which telescopically projects into a larger diameter rod 61 which slidably passes through a tube 62 rigidly carried by plate 58 fastened between the frame members 22 in the bottom of the housing. The rod 61 is fastened to a central portion 63 of a yoke member 64 which has extended flat ends 66 projecting forward and rearward therefrom. The yokes 64 have reinforcing webs 67 near the center portion so that considerable force can be transmitted from the rod 61 to the ends 66 without deflection or distortion of the yoke. For cleaning purposes the yokes 64 can be lifted out of the tubes 62 leaving the plates 59 and rods 60 to fall off. The yokes, plates and treadle rollers can be easily reassembled for use. The bottom support bar 42b has the cutout 45 which coincides with the center portion 63 of the yoke 64 so that the yoke will not interfere with the bar 42b in the raised position of the yoke.

Four vertically disposed box shaped channel members 70 are adapted to be positioned inside the housing by means of bayonet slots 71 engaging over the enlarged heads of the lugs 37. The channels 70 can be easily removed for cleaning. Each channel member 70 has a slot 73 extending up a side wall 74 of the channel such that when the channels are located in the housing, the slots 73 will face from one channel toward the slot in the adjacent channel on that same wall. The ends 66 of the actuator yokes 64 project into the bottom of two of the slots 73 such that the ends 66 of each yoke 64 is free to move up and down therein. Slidably disposed with respect to the surrounding walls of the slots of each channel is a ratchet mechanism 75 which includes an elongate anchor plate 76 slidably disposed on the inside of the channel, a spacer 77 attached to one face of the anchor plate 76 and lying in the slot 73 in the channel, and an elongate carrying plate 79 attached to the spacer 77 on the outside of said channel such that the anchor 76, spacer 77 and plate 79 all slide up and down in the slot 73 relative to the channel. On the outside wall of each carrying plate 79 is mounted in vertically spaced relationship a plurality of stop members 80 and pivoted ratchet fingers 82. Each finger 82 is mounted on a pivot 83 and has one portion 85 projecting horizontally into the opening in the inside of the housing and has another shaped portion 87 adapted to engage the top edge of an adjoining stop member 80. The fingers 82 are shaped in such a way that the projecting portion 85 can be pivoted upward about the pivot 83 without interference from the stop member 80. Upon release of the fingers 82, the fingers will pivot until the portion 87 engages with the stop 80 and rigidly fixes the projecting portion 85 in a horizontal position extending into the space inside of the housing.

The anchor 76, spacer 77 and plate 79 can be removed from its associated channel by just sliding it vertically upward out of the open top of the channel. When in position in the channel, the bottom ends of the reciprocating plates 79 engage the top edge of the ends 66 of the yokes 64 such that upward movement of the yokes move the plates 79 and projecting portions 85 and the fingers 82 upwardly relative to the channels 70 and relative to the support bars 42 on the base plates 39 carried by the housing walls.

In use, a temperature control unit 32 is placed in the housing through the door 34 into the recess 31 in the floor plate 24. Trays 90 of hot food are slid into the inside of the housing through the door 29 with the support bars 42 engaging under the lips 91 of the trays 90. One or any desired number of trays 90 up to the limit of the cart's capacity can be placed in the cart and the door 29 is then closed. The cart can be wheeled to a serving location wherein the temperature control unit 32 can be plugged in and turned on for keeping the food at the proper temperature and moisture level.

The top tray in the cart can be raised to the topmost position in the cart where it will rest on the bars 42a by means of pushing down on the bar 40 of the treadle which causes the rollers 56 to urge the yoke 64 upward. The ends 66 of the yoke slide up in the slots 73 in the channels 70 against the reciprocating plate 79 in each channel so that the fingers of the projecting portions 85 of the plates 79 engage beneath the trays 90 and raise the trays upward. The edges of the trays slide up and depress the bars 42 and 42a toward the walls of the housing until the lip 91 passes the top edge of the bar 42 or bar 42a whereupon the resilience of the bars 42 and 42a urges the bars 42 and 42a underneath the lip of the trays. Letting up on the treadle 40 will permit the yokes 64 and plates 79 to gravitate downward in the channels so that the fingers 82 will disengage from the trays as the tray lips become supported on the ends of the bars 42 or 42a. The fingers will be collapsed by engaging the next lower tray 90 which pivots the fingers 82 about the pins 83 on the plates 79. Once the plate moves down sufficiently for the fingers 82 to clear the tray 90, the fingers will pivot back to the projecting condition below the tray 90 and are ready for raising the tray 90 upon the next actuation of the treadle. Each actuation of the treadle will advance the trays one step toward the top of the cart. The doors 25 can be opened to remove individual pieces of food from the top tray or for removal of the whole tray.

A seal 93 is provided around the inside of the open top of the housing and projects at an angle inwardly toward the center of the inside of the housing. The inner end portion 94 of the seal has a lateral extent which is adapted to engage around the top edge of the top tray 90 when a tray is in the top position in the housing. In this way, the heated or cooled air on the inside of the housing is not permitted to escape therefrom when the top doors 25 are opened for access to the top tray. When the top tray is to be removed from the housing, the operator pushes his hands past the seal 93 and grips the opposite lips 91 of the tray 90 which is then lifted from the housing. The next tray is raised into the top position by actuation of the treadle and food can now be served therefrom or the doors 25 can be closed and the inside of the housing including the top tray is sealed from the outside. The edges 43a of the top bar 42a are folded back against the bars so that as the top tray is grasped the fingers of the worker will not accidentally engage the edge of the bar and attempt to lift the support bar plate 39 from the cart.

By means of the glass 95 in the door 29, it is possible to view how many trays are in the housing and how full they are. As a modification, the door 29 could be just a small door near the lower end of the front wall which would be used to insert trays into the bottom position in the stack.

After each period of use, the cart can be wheeled into an area for cleaning wherein the plates 79 are removed by sliding up and out of the channels, the channels 70 are removed by raising them enough to disconnect the bayonet slots from the lugs, the base plates 39 are removed also by disconnecting the bayonet slots, the temperature control unit 32 is removed and the yokes 64 are lifted out whereupon the inside of the housing can be cleaned and freshened. The parts are replaced into the housing and the cart is again ready for use.

FIGS. 7, 8 and 9 show a modified form of the invention wherein the same reference numerals are applied to the same parts. The treadle actuating mechanism is the same even though details thereof are not shown. The principal difference lies in the tray supporting and tray elevating mechanism. Four channels 120 are removably attached to two opposite walls 12 and 14 means of bayonet slots and lug arrangements 122 with each channel having a continuous and open vertical slot 124 up one side thereof in which slot vertically slides the same anchor 76, spacer 77 and plate 79 arrangement with the horizontally projecting lift fingers 82 inwardly extending into the open part of the housing. The plates 79 and fingers 82 are vertically movable by means of actuation of the treadle 40 as described hereinabove.

Mounted on the side of each channel remote from the slotted side is a plurality of vertically spaced apart support fingers 130 which are pivotally mounted on a pin 131 and are shaped so as to be pivotal in an upward direction but engage a fixed stop 133 on the channel 120 which holds the fingers 130 in a horizontal position. The support fingers 130 are vertically spaced apart the same distance as the lift fingers 85 on the movable plate 79 but are located vertically approximately midway between the movable lift fingers 85 when the movable lift fingers 85 and plate 79 are in the lowermost position.

In use, trays 90 are stored by means of the support fingers 130 engaging the underside of lip 91. The trays 90 are raised by depressing the treadle 40 which raises the yokes 64 and plates 79 with the lift fingers 85 engaging beneath the tray 90 and raising it first into engagement with the lower surface of the next higher fingers 130. Continued raising of the tray 90 moves the lip 91 past the fingers 130 which fingers 130 then pivot back to the horizontal position below the tray 90 such that slowly releasing the treadle 40 lowers the tray 90 into supporting position on the fingers 130 next below the tray. The next actuation of the treadle will raise the tray or trays in the cart one more set of fingers 130 up the inside of the housing. The top opening doors can be opened to remove food from the top tray or to remove the top tray altogether. A seal similar to the seal 93 shown in FIGS. 2 and 3 can be incorporated around the inside of the top of the housing to close the inside of the housing from the outside except for the top tray.

The channels 120 and plates 79 are removable from the lugs in the walls of the cart in any well known manner, as shown the bayonet slot arrangement 122 is used.

From the above, it is believed to be obvious that an improved food serving cart is provided which has means for adding or removing trays from the cart, has means for keeping food in the cart warm, moist or cool, has means for raising trays to provide ready access to the top tray only without affecting the heating or cooling of the food in the remaining trays in the housing and has means for removing the operative parts from the cart so as to make it possible to clean and sanitize the inside of the cart.

We claim:

1. A temperature insulated food service cart having means for closing opennigs into said cart, vertically spaced means for supporting at least one tray inside said cart, said tray supporting means being retractable to permit a tray to be raised past said means, and means for raising said trays from one tray supporting means to the next higher tray supporting means, and means for raising said trays comprising plural members mounted on opposite walls of the cart, means vertically movable in each plural member, finger means carried by said last named means and projecting into the open space in the cart in position to engage the underside of a tray, and external means for providing the vertical movement to said vertically movable means for raising a tray to the next higher supporting means.

2. A food service cart as claimed in claim 1 wherein said vertically spaced means are mounted on a pair of base members which are removably mounted on opposite walls inside said cart with the means on each base member projecting into the inside of said cart towards each other.

3. A food service cart as claimed in claim 1 wherein said finger means on the vertically movable means are pivotally mounted for movement in an upward direction and have stop means on the movable means which prevents the finger means from moving downward beyond a predetermined point.

4. A food service cart as claimed in claim 1 wherein one of the means for closing an opening in the cart is a door hinged to the cart for closing a top opening into the cart.

5. A food service cart as claimed in claim 1 wherein said support means for a tray and said means for raising said tray are both carried by the same vertically disposed member.

6. A food service cart as claimed in claim 1 wherein said external means comprises a foot operated treadle, and yoke means in the cart operatively connected to the treadle so that downward movement of the treadle will urge the yoke upward against said means for raising the trays.

7. In a food service cart having temperature insulated bottom, top and side walls, egress and ingress openings in said cart, doors on said cart for closing said egress and ingress openings, means for controlling the temperature inside said cart and means for facilitating transportation of the cart from one location to another, in combination with tray supporting means and tray elevating means within said cart for receiving a tray and elevating it to a position convenient for access thereto through said egress opening when said egress door is open, said supporting means comprising means carried by the walls inside said cart and having plural depressable tray supporting members aligned one above the other thereon, said elevating means comprising means carried by the walls inside said cart having plural ratchet members thereon extending into the open area inside said cart, actuating means accessible from outside said cart for reciprocating said means through a predetermined cycle of operation whereby said ratchet members engage a tray supported on one of said supporting means and urge it upward past the next higher supporting member, and release of said actuating means causes said ratchet members to retract as they move downward past the tray and are repositioned ready for a subsequent raising of said tray.

8. A temperature insulated food service cart having doors for closing openings into said cart, means for supporting trays inside said cart, means for raising said trays vertically from one supporting means to the next, said means for raising said trays comprising reciprocating means carried by the inside walls of said cart and having plural ratchet members thereon extending into the open area inside said cart, actuating means accessible from outside said cart for moving said reciprocating means through a predetermined cycle of operation whereby said ratchet members engage a tray and urge it upward past a supporting member, and release of said actuating means causes said ratchet members to retract as it moves downward past said tray and repositions ready for a subsequent raising of said tray.

9. A food service cart as claimed in claim 8 having means positioned in said cart for controlling the temperature inside said cart.

10. A food service cart as claimed in claim 8 wherein said means for supporting said trays comprises a pair of base members removably attached to opposite walls inside said cart, and bars pivoted on each of said base members one above the other and being located in a projecting relationship into said cart, said bars being pivoted upwardly to a position to permit trays to be moved upwardly thereby.

11. A food service cart as claimed in claim 10 wherein said actuating means comprises a pivoted foot actuated treadle which urges a pair of yoke members upwardly inside said cart, said yoke members engaging said reciprocating means for urging said ratchet members upwardly each time the treadle is depressed.

12. A food service cart as claimed in claim 11 wherein said reciprocating means comprises a pair of channel members removably mounted on each of a pair of opposite walls in said cart, and a plate slidably attached to each channel member and constrained for movement in a vertical direction, said ratchet members being mounted on said slidable plate for reciprocation therewith.

13. A food service cart as claimed in claim 8 wherein said means for supporting said trays are carried by the same member as supports the reciprocating means for raising said trays.

References Cited

UNITED STATES PATENTS

| | | | |
|---|---|---|---|
| 3,053,600 | 9/1962 | Holloway | 312—71 |
| 3,205,033 | 9/1965 | Stentz | 312—236 |

FOREIGN PATENTS 942,960  11/1963  Great Britain.

CASMIR A. NUNBERG, Primary Examiner

U.S. Cl. X.R.

312—290, 306